Patented Mar. 22, 1927.

1,622,206

UNITED STATES PATENT OFFICE.

GUSTAV PISTOR, OF BITTERFELD, GERMANY, ASSIGNOR TO I. G. FARBENINDUSTRIE AKTIENGESELLSCHAFT, OF FRANKFORT, GERMANY.

PRODUCTION OF PHOSPHORUS PENTOXIDE.

No Drawing. Application filed December 8, 1925, Serial No. 74,168, and in Germany December 30, 1924.

This invention relates to the production of phosphorus pentoxide $P_2O_5$ by burning phosphorus or gas mixtures containing phosphorus and air. The object of the invention is to utilize the large amount of heat produced by this chemical reaction, whereby the economy of this process can be considerably improved.

In the first instance it would be desirable to utilize the heat which is produced by the above-mentioned reaction for heating water in a steam-boiler, but this would not be practicable under ordinary conditions, as the moisture, contained in the combustion-air, suffices to convert some part of the phosphorus pentoxide to phosphoric acid $H_3PO_4$ which thus would be deposited on the walls of the boiling-tubes and converted to glacial phosphoric or phosphoric acid, whereby the metal of the tubes would be corroded, and the transmission of heat impaired.

Now I have found that this difficulty may be avoided by previously energetically drying the air needed for the combustion, preferably by means of the phosphorus pentoxide which is produced by the process itself, or by means of strong phosphoric acid obtained from the said phosphorus pentoxide.

The reaction heat may be used for producing steam in an ordinary steam-boiler or in any other known device for utilizing waste heat. The product of combustion is carried away by the streaming gases and may be collected in the well known manner. Should deposits of the pulverulent masses occur, they may be easily knocked off from the tubes or other walls of the combustion apparatus.

I claim:—

1. The method of making the combustion products of phosphorus and air non-corrosive upon metal vessels which consists in drying the air by means of phosphorus pentoxide obtained by a previous operation.

2. The method of making the combustion products of phosphorus and air non-corrosive upon metal vessels which consists in drying the air by means of hygroscopic phosphorus compounds obtained by a previous operation.

In testimony whereof I affix my signature.

GUSTAV PISTOR.